United States Patent [19]
Broussard

[11] Patent Number: 5,492,622
[45] Date of Patent: Feb. 20, 1996

[54] WATER CLARIFICATION APPARATUS

[76] Inventor: Paul C. Broussard, 209 Constitution Dr., Maurice, La. 70555

[21] Appl. No.: 359,406

[22] Filed: Dec. 20, 1994

Related U.S. Application Data

[63] Continuation-in-part of Ser. No. 123,231, Sep. 20, 1993, Pat. No. 5,407,584, which is a continuation-in-part of Ser. No. 965,888, Oct. 23, 1992, Pat. No. 5,277,803, which is a continuation-in-part of Ser. No. 589,471, Sep. 28, 1990, Pat. No. 5,158,678.

[51] Int. Cl.$^6$ ............... B04C 5/14; B04C 9/00; B01D 17/035
[52] U.S. Cl. ............ 210/202; 210/221.1; 210/221.2; 210/295; 210/256; 210/294; 210/512.2; 209/728
[58] Field of Search .................. 210/202, 207, 210/221.1, 221.2, 294, 256, 512.1, 512.2, 295; 209/728, 733, 729

[56] References Cited

U.S. PATENT DOCUMENTS

| | | |
|---|---|---|
| 1,951,647 | 3/1934 | Cooke . |
| 3,959,139 | 5/1976 | El-Hindi . |
| 3,960,734 | 6/1976 | Zagorski . |
| 4,208,270 | 6/1980 | Grieve . |
| 4,274,968 | 6/1981 | Grutsch . |
| 4,316,729 | 2/1982 | Maclean . |
| 4,572,786 | 4/1974 | Ruthrof . |
| 4,601,734 | 7/1986 | Meier . |
| 4,626,345 | 12/1986 | Krofta . |
| 4,673,495 | 6/1987 | Carroll . |
| 4,698,077 | 10/1987 | Peltola . |
| 4,726,902 | 2/1988 | Hubbard . |
| 4,728,428 | 3/1988 | Broussard . |
| 4,755,295 | 7/1988 | Donhauser . |
| 4,783,272 | 11/1988 | Patterson . |
| 4,824,563 | 4/1989 | Iwahori . |
| 4,878,924 | 11/1989 | Yano . |
| 5,021,165 | 6/1991 | Kalnino . |
| 5,064,531 | 11/1991 | Wang . |
| 5,068,031 | 11/1991 | Wang . |
| 5,069,783 | 12/1991 | Wang . |
| 5,080,802 | 1/1992 | Cairo . |

(List continued on next page.)

FOREIGN PATENT DOCUMENTS

| | | |
|---|---|---|
| 24148 | 2/1981 | European Pat. Off. . |
| 60-28880 | 2/1985 | Japan . |
| 2-112321 | 2/1990 | Japan . |
| 1121236 | 10/1984 | U.S.S.R. . |
| 1143437 | 3/1985 | U.S.S.R. . |
| 1228913 | 5/1986 | U.S.S.R. . |
| 1306604 | 4/1987 | U.S.S.R. . |
| 1416443 | 8/1988 | U.S.S.R. . |
| 1421709 | 9/1988 | U.S.S.R. . |
| 1480847 | 5/1989 | U.S.S.R. . |
| 89/07971 | 9/1989 | U.S.S.R. . |
| 1526836 | 12/1989 | U.S.S.R. . |
| 1535578 | 1/1990 | U.S.S.R. . |
| 1563767 | 5/1990 | U.S.S.R. . |
| 1636006 | 3/1991 | U.S.S.R. . |
| 1687577 | 10/1991 | U.S.S.R. . |
| 1699941 | 12/1991 | U.S.S.R. . |
| 86/03143 | 6/1986 | WIPO . |

*Primary Examiner*—Thomas M. Lithgow
*Attorney, Agent, or Firm*—George A. Bode

[57] ABSTRACT

An apparatus and method for clarifying a contaminated fluid comprising a separator vessel having therein a pair of cyclonic flow chambers; preliminary spiral separators introduce the contaminated fluid to be separated into the cyclonic flow chambers by tangential inlets so as to establish a swirling body of fluid in each chamber; the cyclonic flow chambers have a shell positioned below their respective tangential inlets for discharging separated solids to a collection area and separating an oil and water mixture into a fluid flow zone formed by the cyclonic flow chambers and the wall of the separator vessel wherein water and oil are separated by aeration provided by sparging tubes; a vertical outlet port discharges separated oil and gas from the upper portion of the cyclonic flow chambers to a fluid flow zone wherein oil and gas are separated. The separated water, oil, gas and solids are removed through discharge ports.

8 Claims, 9 Drawing Sheets

U.S. PATENT DOCUMENTS

| | | |
|---|---|---|
| 5,084,165 | 1/1992 | Sang . |
| 5,084,189 | 1/1992 | Richter . |
| 5,100,546 | 3/1992 | Broussard . |
| 5,112,479 | 5/1992 | Srimorgkolkal . |
| 5,158,678 | 10/1992 | Broussard . |
| 5,167,806 | 12/1992 | Wang . |
| 5,202,026 | 4/1993 | Lema . |
| 5,209,765 | 5/1993 | Kolpak . |
| 5,277,803 | 1/1994 | Broussard . |
| 5,300,222 | 4/1994 | Broussard . |
| 5,407,584 | 4/1995 | Broussard . |

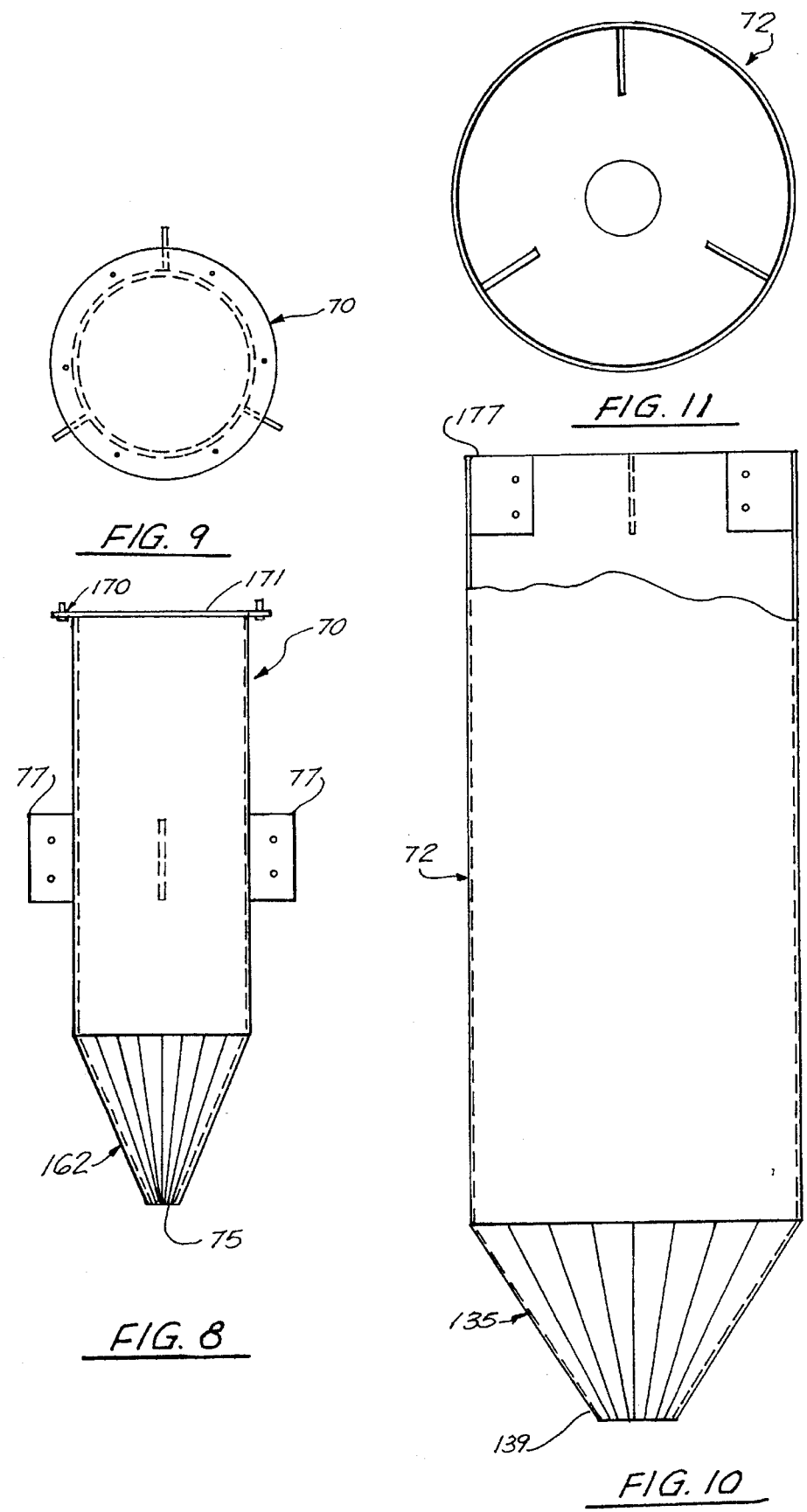

WATER CLARIFICATION APPARATUS

This application is a continuation-in-part application of a previous application by the same inventor bearing U.S. Ser. No. 08/123,231 filed Sep. 20, 1993, now U.S. Pat. No. 5,407,584 which is a continuation-in-part application of U.S. Ser. No. 07/965,888 filed Oct. 23, 1992, now U.S. Pat. No. 5,277,803 issued Jan. 11, 1994, which is a continuation application of U.S. Ser. No. 07/589,471 filed Sep. 28, 1990, now U.S. Pat. No. 5,158,678 issued Oct. 27, 1992. The entirety previous applications U.S. Ser. No. 08/123,231 filed Sep. 20, 1993, which is a continuation-in-part application of U.S. Ser. No. 07/965,888 filed Oct. 23, 1992, which is a continuation application of U.S. Ser. No. 07/589,471 filed Sep. 28, 1990, now U.S. Pat. No. 5,158,678 issued Oct. 27, 1992, is incorporated herein by reference as if set forth in full below.

BACKGROUND OF THE INVENTION

1. Field of the Invention

The present invention pertains to a method and apparatus for separation of suspended matter from a liquid. The method and apparatus more specifically applies to a system wherein the separation is accomplished in a vertical single cell vessel by multiple internal hydrocyclones or cyclonic separators for solids and aeration by sparging tubes which provide gas bubbles within the main vessel to cause coalescing and separation of the remaining suspended matter from the water.

2. General Background

Oil/water and solid separators have been widely used in the oil and gas industry, and in pulp and paper mills, municipal waste treatment facilities, steel mills, food processing plants and electricity generating plants. There is thus an ever present and growing problem of contaminated waste water as a by-product of these various processes, and in particular, water produced in the production of oil and gas wells as well as waste water in the refinement process. Air/gas floatation is the method most commonly used to separate suspended material and oil from water and other liquids. Three basic types of air/gas floatation systems exist: dissolved air or gas; rotor-type disbursed air or gas; and, eductor-type disbursed air or gas systems. The hydrocyclone method also has been applied to the separation of suspended matter from liquids. A typical version of the single cell assembly is disclosed in U.S. Pat. No. 3,986,654 issued to George, et al. This assembly incorporates a single, horizontal, U-shaped tank through which the fluid to be treated is passed. A gas stream is injected into this tank and percolates through the fluid while the pressure of the fluid is increased. After such pressure is released, the gas breaks out of solutions and attaches itself to any contaminants in the fluid, thereby separating these contaminants from the fluid.

A simplified vertical single cell assembly is disclosed in U.S. Pat. No. 5,080,802 to Cairo, Jr., et al. This assembly incorporates a vertical vessel with an internal riser tube which contains additional coalescing means installed therein through which the fluid to be treated is passed. The riser tubes are in open communication with the fluid at or below the surface. An externally mounted eductor system is used along with a static mixing chamber to mix the contaminated liquid influent and a gas injected into the stream by the eductor before the mixture is released into the internal tube section of the vessel.

Yet another system disclosed in U.S. Pat. No. 4,255,262 to O'Cheskey provides an apparatus which mixes and disburses gas in the form of fine bubbles and liquid in a tank in an attempt to remove contaminants from the liquid flow into the tank. The gas is induced from an upper section of the tank downwardly into the liquid in the tank via a draft tube. The gas induction occurs as a part of the liquid contained in the vessel is recycled back through the individual cells or compartments using a centrifugal pump. The apparatus uses a mechanical skimmer assemble which serves to remove contaminated froth accumulated on the surface of the liquid in the tank.

SUMMARY OF THE PRESENT INVENTION

The apparatus and method of the present invention provide a system which solves the aforementioned problems associated with clarifying contaminated liquids with a high solid and high oil content. What the present invention provides is a system which does not rely on induced air/gas floatation separation alone, but incorporates cyclonic separators to separate, by the force of gravity, the solids and oil from the contaminated fluid on the inlet of the separator. The first portion or stage of the system utilizes a spiral separation coalescer (SPIRALSEP) provided to increase the micron size of the contaminated particles entering the inlet piping. The coalesced fluid then flows into one or both of a pair of hydrocyclones which are provided for the removal of solids from the water by centrifugal force to separate contaminants by density or simulated gravity to separate the oil as well as the influent liquid. The solids are retained in the cone section of each hydrocyclone for ease of removal as well as to prevent the solids from plugging the optional horizontal pack or filter section. Oil will exit at the top of the cyclonic separators through an orifice in each which controls the upward flow and forces a large portion of the fluid to exit the bottom of each of the cyclonic separators. The second portion or stage of the system utilizes aerating means or sparging tubes that aerate the fluid with microfine gas bubbles as it flows down through the vessel. A third portion or stage, which is optional, is a coalescer or pack section or filter medium positioned above the sparging tubes and below the exit at the top of the cyclonic separators to pretreat the oil remaining in the fluid before introduction of the fine gas bubbles by the sparging tubes.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 8 is an elevational view of the outer core of the embodiment of FIG. 1;

FIG. 9 is a top plan view of the outer core of FIG. 8;

FIG. 10 is an elevational view of the sand hopper of the embodiment of FIG. 1;

FIG. 11 is a top plan view of the sand hopper of FIG. 10;

DETAILED DESCRIPTION OF THE PREFERRED EMBODIMENT

Figure 21:
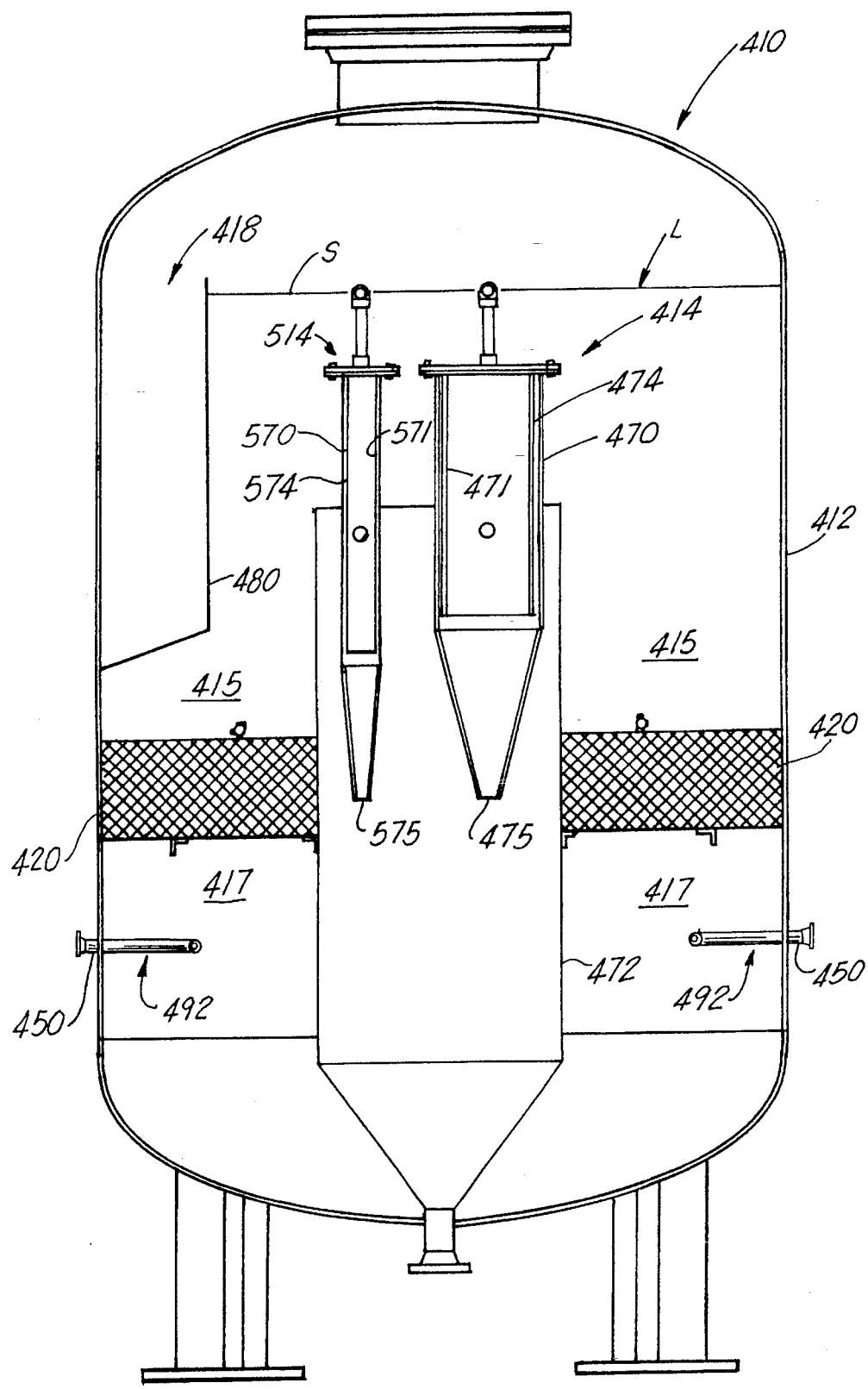
FIG. 21 is a sectional view of the second embodiment of the apparatus of the present invention with some detail removed; and, FIG. 22 is a sectional view, with some detail (including the pack section 420) removed, of the embodiment of FIG. 21.
Figure 22:
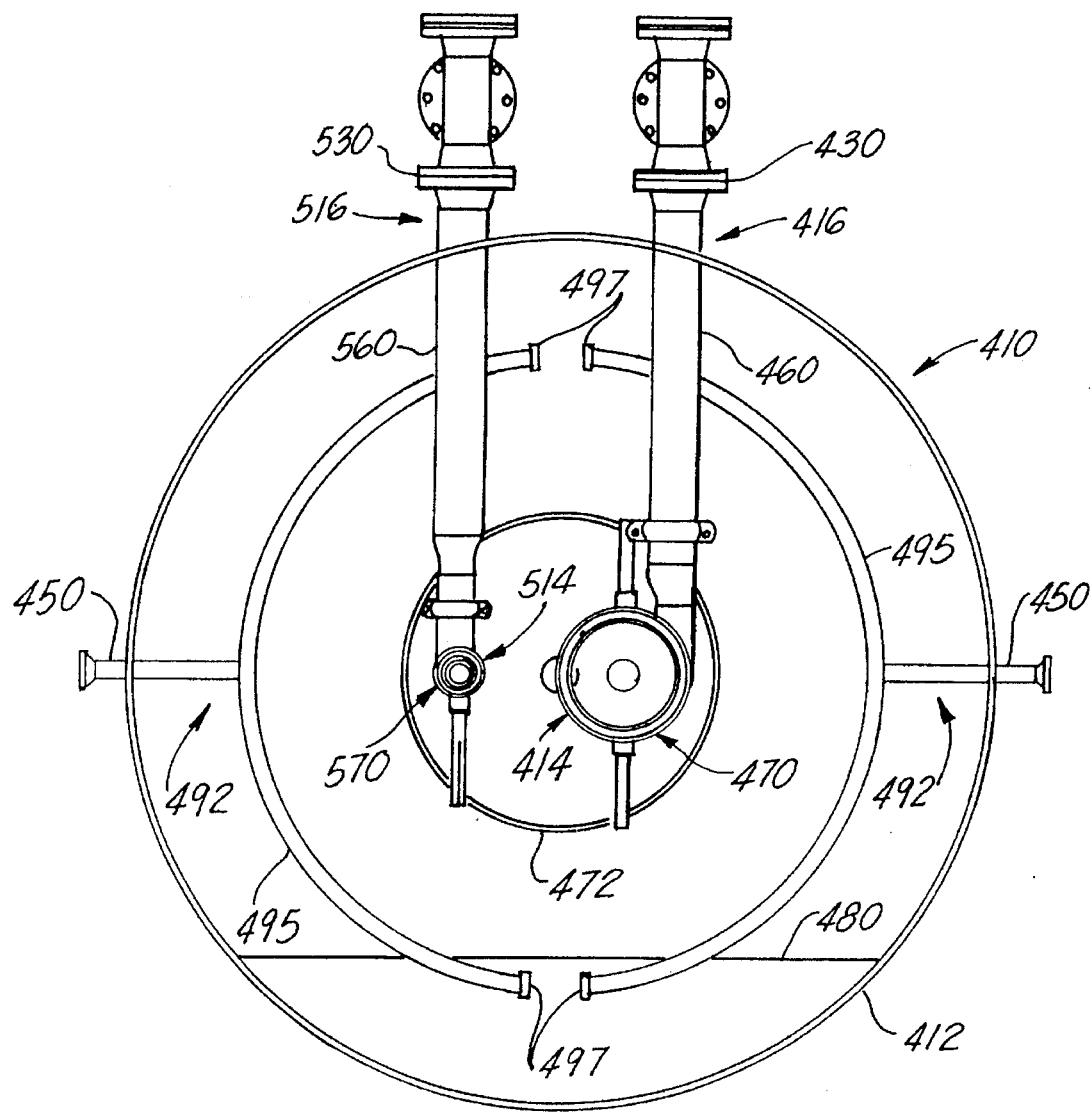

Referring now to the drawing, and in particular FIGS. 21 and 22, the second embodiment of the apparatus of the present invention is designated generally by the numeral 410.

The apparatus of the second embodiment of the present invention 410 is generally described as a vertical oil/water/solid separator vessel 412 with a pair of hydrocyclones ("cyclones") or cyclonic separators 414, 514 provided centrally therein and single cell floatation areas 415, 417 and sparging tubes 492 as an aeration means.

The two cyclones 414, 514 are illustrated in the second embodiment of FIGS. 21 and 22; however, additional cyclones can be provided. Because the cyclones 414, 514 are piped to the outside of vessel 412, either or both of cyclones 414, 514 can be used. Different size cyclones are normally installed to allow the operator to use the one of his choice (or both), for example, the smaller cyclone 514 during start-up and the larger cyclone 414 (or both cyclones) after start-up. In FIGS. 21 and 22, the cyclone 414 is approximately three (3) times as large as cyclone 514, but this is merely for illustration and not to be taken as limiting.

Figure 2:
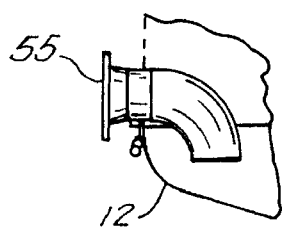
FIG. 2 is an enlarged elevational view of the cleansed water discharge outlet of the embodiment of FIG. 1.
Figure 1:
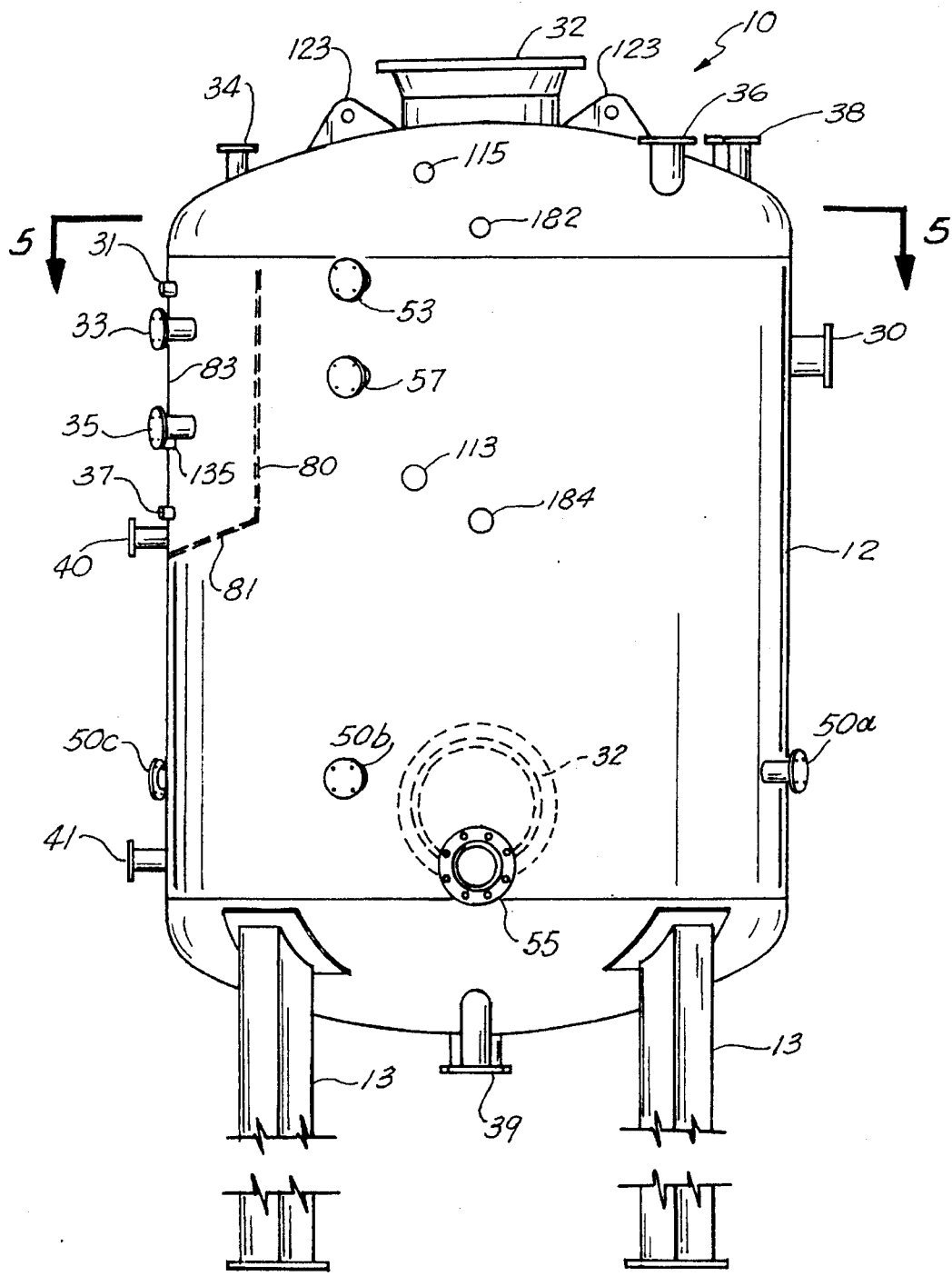
FIG. 1 is a front elevational view of the first embodiment of the apparatus of the present invention described in Ser. No. 08/123,231.
Figure 3:
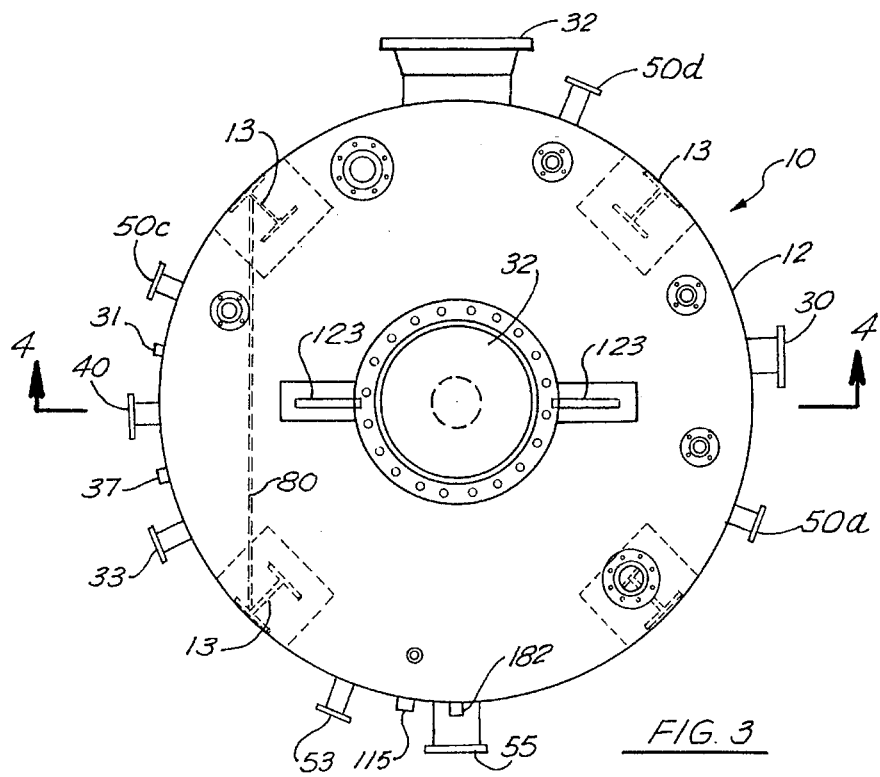
FIG. 3 is a top plan view of the embodiment of FIG. 1.
Figure 4:
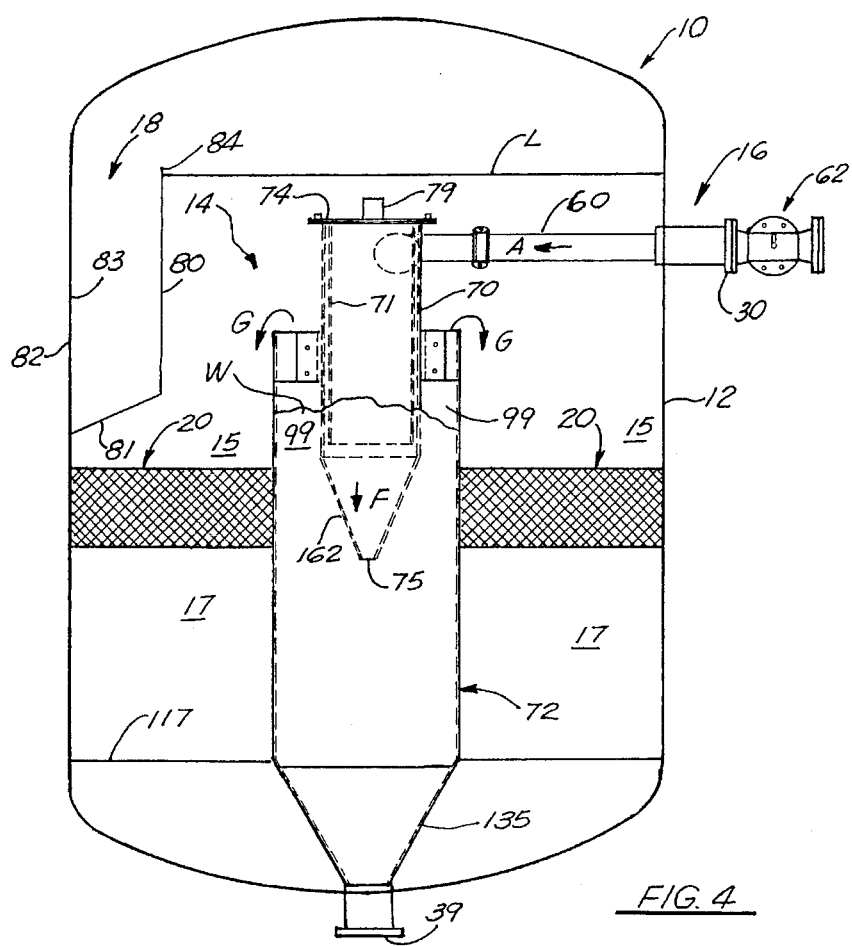
FIG. 4 is a sectional view, with some detail removed, taken along the LINES 4—4 of FIG. 3.
Figure 7:
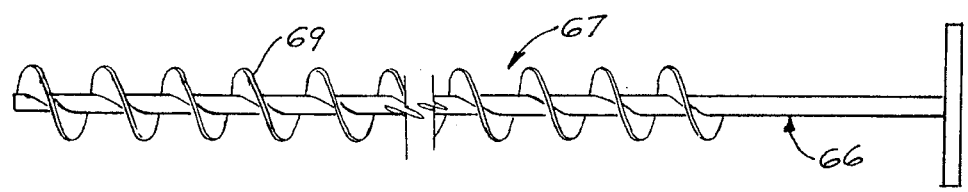
FIG. 7 is an elevational view of the central shaft mounted spiral blades or auger of the SPIRALSEP of FIG. 6.
Figure 6:
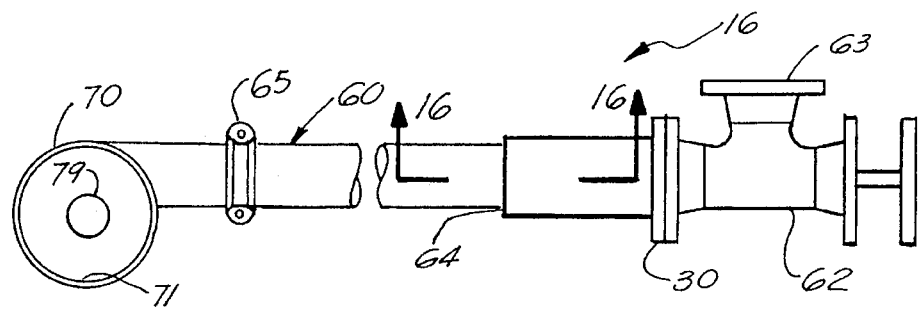
FIG. 6 is an enlarged view of the "SPIRALSEP" of the embodiment of FIG. 1.
Figure 5:
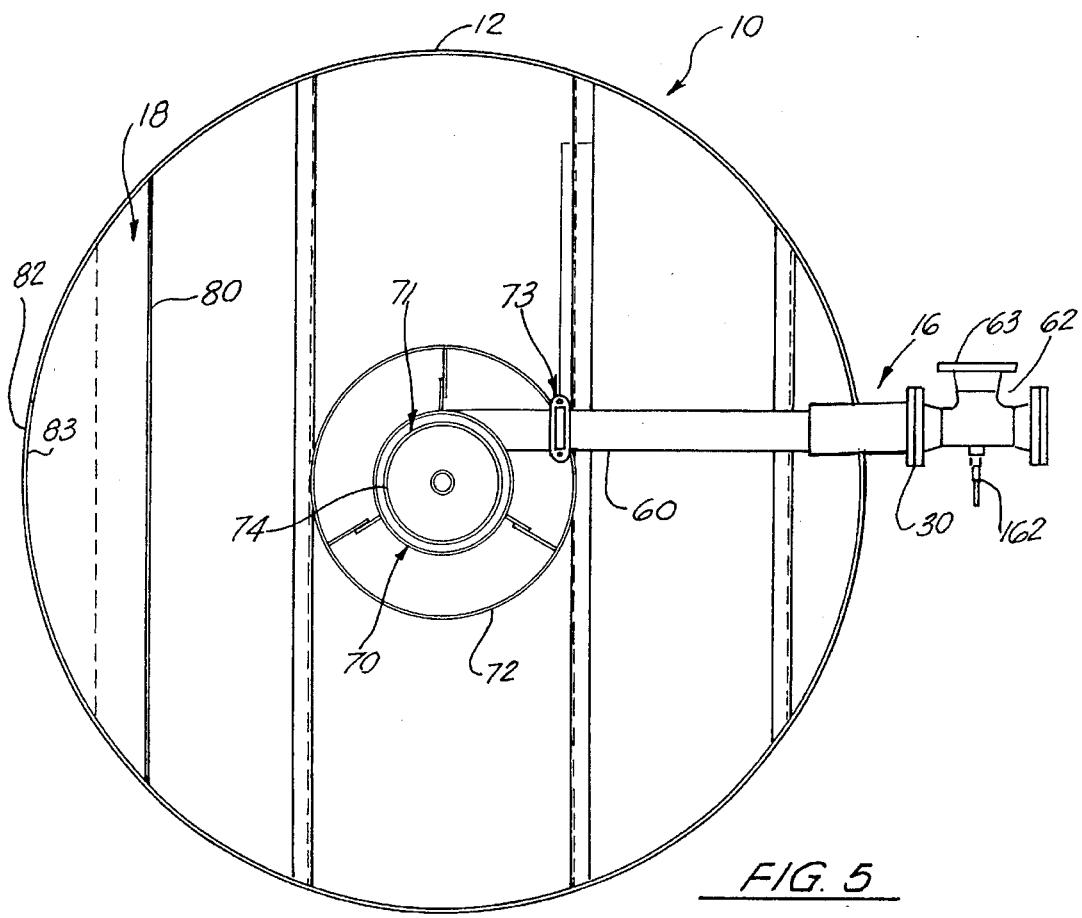
FIG. 5 is a sectional view, with the pack section and some other details removed, taken along LINES 5—5 of FIG. 1.
Figure 12:
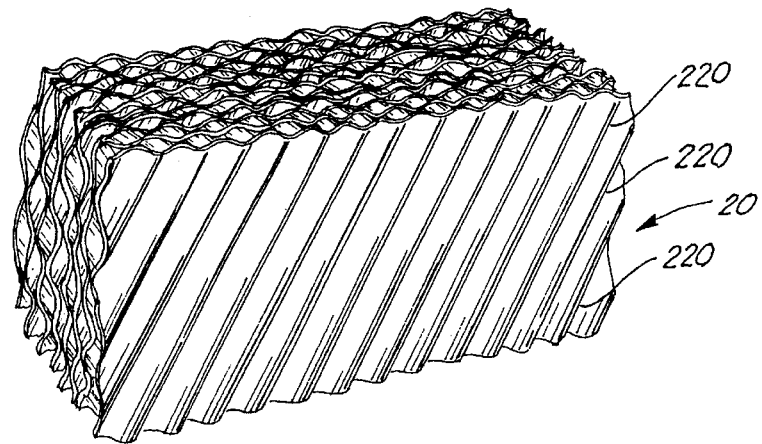
FIG. 12 is a top perspective view of the pack section of the embodiment of FIGS. 1 and 4.
Figure 14:
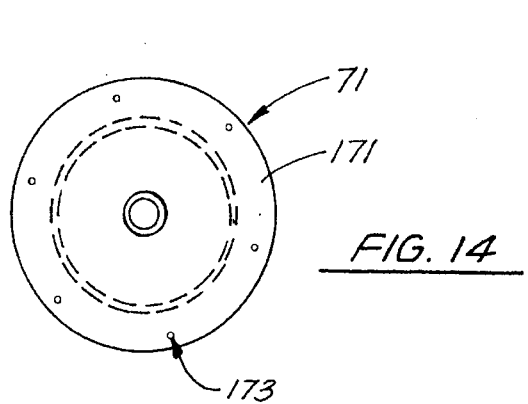
FIG. 14 is a top plan view of the inner core of FIG. 13.
Figure 15:
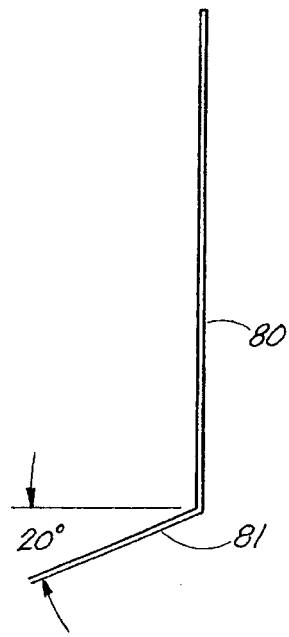
FIG. 15 is an elevational partial view of the oil bucket of the embodiment of FIG. 1.
Figure 13:
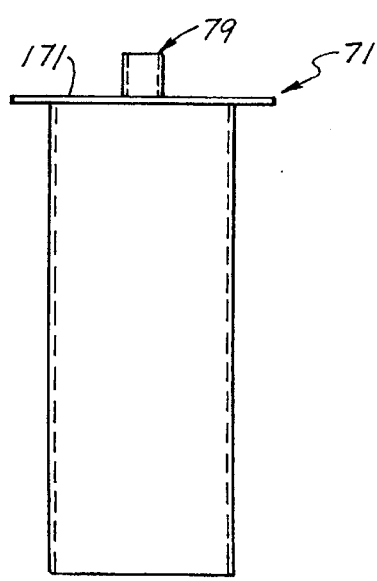
FIG. 13 is an elevational view of the inner core of the apparatus of the present invention.
Figure 16:
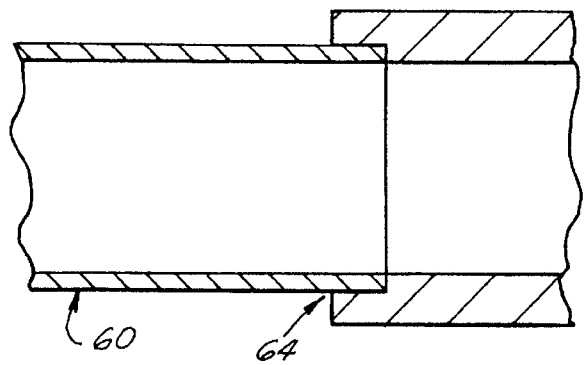
FIG. 16 is a sectional view taken along LINES 16—16 of FIG. 6.
Figure 17:
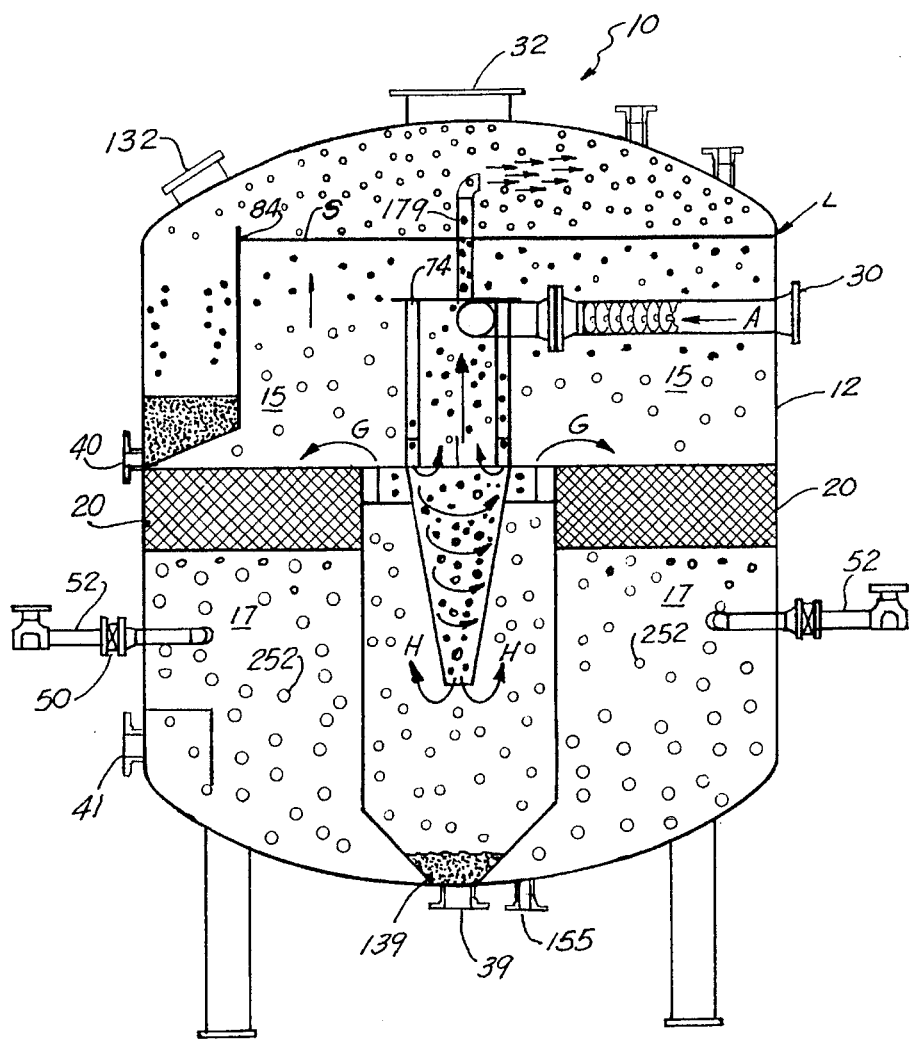
FIG. 17 is a sectional view of the embodiment of FIG. 1, with some detail removed, illustrating its operation and method.
Figure 18:
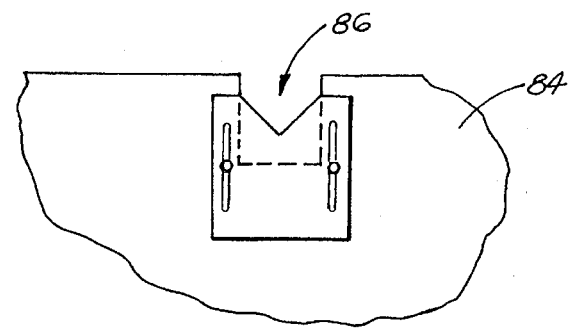
FIG. 18 is a pictorial view, partially broken away, of the weir of the embodiment of FIG. 1.

In operation, the contaminated fluid to be separated enters separator vessel 412 via inlet piping (not shown) connected at inlets 430, 530, shown in FIG. 22, which extend into the vessel 412 and attach tangentially to their respective cyclonic separators 414, 514. Connected to inlets 430, 530 interiorly of vessel 412 are preliminary separators or coalescers 416, 516, respectively (previously identified as a "SPIRALSEP" 16 in my earlier co-pending applications Ser. No. 07/965,888 and 08/123,231, best seen in FIGS. 6 and 7) which begin the separation process while fluid is still within pipelines 460, 560 and before it enters hydrocyclones 414, 514. The operation of SPIRALSEP 16 (and thus SPIRALSEPs 416, 516) has been previously described in Ser. No. 08/123,231.

The operation of hydrocyclones 414, 514 is described by the operation of hydrocylone 14 in Ser. No. 08/123,231 with similar elements identified by the 400 and 500 series of numbers in this application (i.e., openings 75 and openings 475, 575, etc.).

The sparging tubes 492, best seen in FIGS. 21 and 22, will introduce micro-fine gas bubbles 252 into the water flowing downwardly in vessel sections 415 and 417 of vessel 412 to attach to the remaining oil droplets and to lift them to the surface "S" (best seen in FIG. 17) for eventual skimming. Sparging tubes 492 can be mounted on the top of the vessel 412 when the optional coalescer or pack section 420, best seen in FIGS. 4, 12, 17 and 21, is not installed or, sparging tubes 492 can be mounted near the bottom, as seen in FIG. 21 (where they would be connected to inlets 450). When mounted internally near the bottom as best seen in the second embodiment of FIGS. 21 and 22, each of the sparging tubes 492 will carry the liquid and bubbles 252 into vessel 412 through the inlet nozzles 450 to semi-circular piping 495 and to the multiple nozzles 497 at the ends of piping 495 to direct the flow in a counter-circular motion around the vessel 412. Further, the exit nipples (not shown) of nozzles 497 can be flattened to deliver a fan flow (as shown at 90 and by ARROWS J in FIG. 19) to fill the area of vessel section 417 between the outer wall of sand hopper 472 and the inner wall of the separator vessel 412. This has the previously noted effect of increasing the surface area of the bubbles 252 to flood the zone with the micro-fine bubbles 252 so as to contact the remaining oil droplets in vessel sections or areas 415 or 417 before it can exit the vessel. The size of the sparging tubes 492 will be controlled by the diameter of vessel 412 and by the annular spaces 474, 574 between the inner and outer cores 471, 571 and 470, 570 as well as the volume of liquid to be separated. In the second embodiment of FIG. 21, two (2) sparging tubes 492 are employed. Vessel 412 can be built as a pressurized vessel or a non-pressurized vessel depending upon the requirements and needs.

Sparging tubes 492 introduce micro-fine gas bubbles 252 into vessel 412. Additionally, a filter or pack section 420 separates and collects oil from water and gas bubbles passing therethrough.

The cleansed water, solids, oil and gas have various outlets from vessel 412. A plurality of sparging tubes 492 introduce gas bubbles 252 into vessel 412 and cleansed water is removed and provides a means for controlling the introduction of contaminated fluid at the preliminary separators 416, 516.

Figure 19:
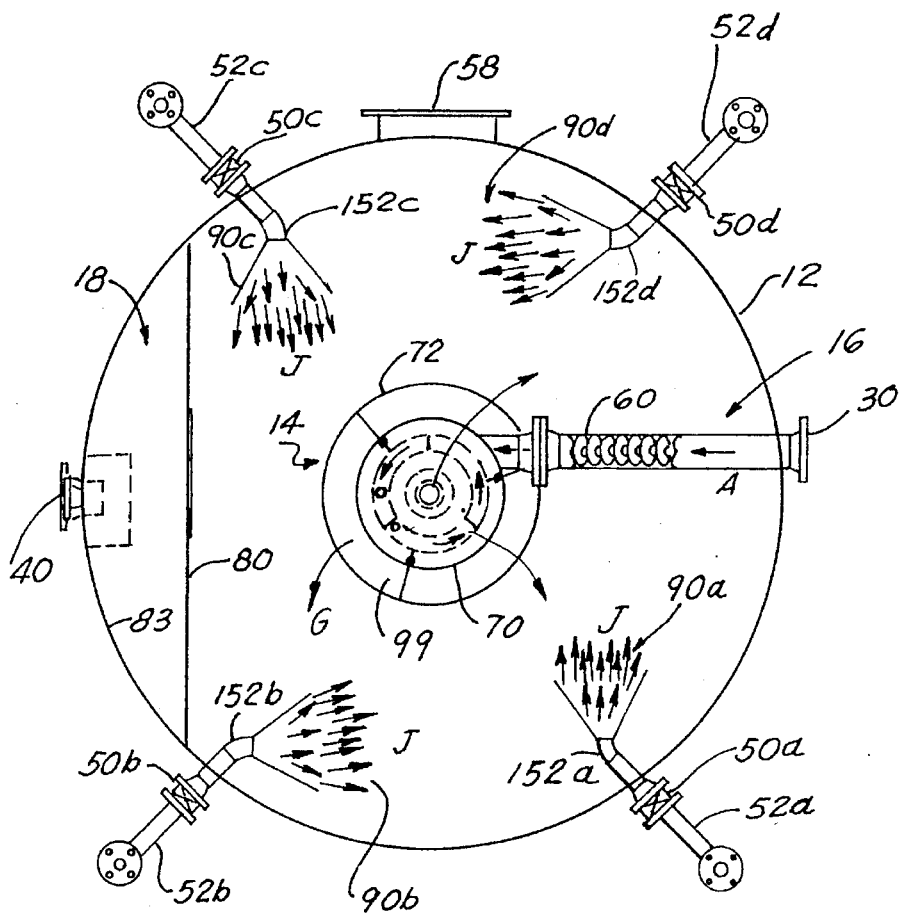
FIG. 19 is a sectional view, with some detail removed, taken along LINES 5—5 of FIG. 1 illustrating the operation and method of the preferred embodiment.
Figure 20:
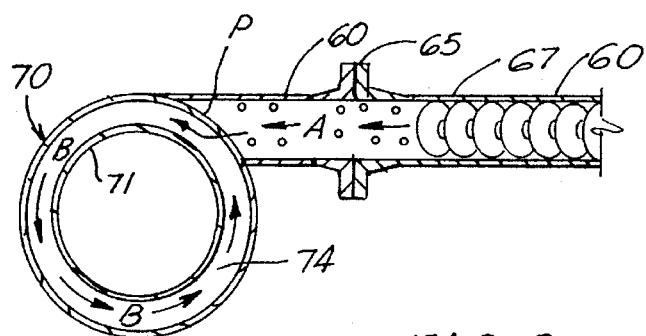
FIG. 20 is an enlarged partial view of the cyclonic separator of FIG. 19.

Turning now to FIGS. 17 and 19–22, the operation of the second embodiment can be understood. Sparging tubes 492 are connected to inlet piping 450 and are powered under a vacuum and introduce micro-fine gas bubbles 252 into chamber 417 of vessel 412 as best seen in FIGS. 19 and 21 and 22. These bubbles 252 fan out at the nozzles 497 of sparging tubes 492 within vessel section 417 of vessel 412 as at area 90 in FIG. 19.

With sparging tubes 492 of the second embodiment replacing eductors 52 of the first embodiment, the system 410 does not require a reflux or recycle pump system, and can be used at a situs where no electrical power is available, but low pressure gas is available for the sparging system 492.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for clarifying a contaminated fluid, comprising:
   (a) a separator vessel having provided therein a plurality of cyclonic flow chamber means, one of said cyclonic flow chamber means being of a different size than at least one other of said cyclonic flow chamber means, whereby different flow rates are established therein, each of said cyclonic flow chamber means including:
      (i) a first vertical cylindrical shell having an outlet at the bottom and being closed at the top; and,
      (ii) a second cylindrical shell concentrically positioned within said first shell, thereby providing an annular space therebetween, and having an outlet port at the top which extends outside of said first cylindrical shell and being open at the bottom;
   (b) means for tangentially introducing said contaminated fluid to be separated into each of said annular spaces between said first and second shells so as to establish swirling bodies of fluid therein;
   (c) a third cylindrical shell annularly surrounding a lower portion of said first shells of said cyclonic flow chamber means and extending below the outlets of said first shells, the upper portion of said third shell being positioned below said tangential introducing means;
   (d) means for discharging a first separated fluid of said contaminated fluid into a first fluid flow zone in said separator vessel, said means for discharging comprising the upper portion of said third cylindrical shell and the lower portion of said first cylindrical shells, said first fluid flow zone being formed by the outer walls of said shells and said separator vessel; and,
   (e) means for discharging a second separated fluid from said outlet port at the upper portion of each of said second shells to a second fluid flow zone located in the upper portion of said vessel.

2. The apparatus of claim 1, further comprising aeration means for introducing air into said first fluid flow zone.

3. The apparatus of claim 2, wherein said aeration means includes an inlet port connected to a semi-circular conduit having a discharge nozzle at its proximate and distal ends.

4. The apparatus of claim 1 further comprising filtration means positioned intermediate said first and second fluid flow zones for collecting oil droplets from said first separated fluid as it passes therethrough.

5. An apparatus for clarifying a contaminated fluid comprising:
   (a) a cylindrical separator vessel having provided therein a plurality of cyclonic flow chamber means, one of said cyclonic flow chamber means being of a different size than at least one other of said cyclonic flow chamber means, whereby different flow rates are established therein, each of said cyclonic flow chamber means including:
      (i) a first vertical cylindrical shell closed at the top and having a lower truncated portion having an outlet at the bottom thereof; and,
      (ii) a second cylindrical shell concentrically positioned within said first shell, thereby providing an annular space therebetween, and being open at the bottom and having an outlet port at the top which extends outside of said first cylindrical shell which passes through said first shell;
   (b) means for tangentially introducing said contaminated fluid to be separated into each of said annular spaces between said first and second shells so as to establish swirling bodies of fluid therein;
   (c) a third cylindrical shell annularly surrounding a lower portion of said first shells of said cyclonic flow chamber means extending below the outlets of said first shells, the upper portion of said third shell being positioned below said tangential introducing means;
   (d) means for discharging a first separated fluid of said contaminated fluid into a first fluid flow zone in said separator vessel, said means for discharging comprising the upper portion of said third cylindrical shell and the lower portion of said first cylindrical shells, said first fluid flow zone being formed by the outer walls of said shells and said separator vessel; and,
   (e) means for discharging a second separated fluid from said outlet port at the upper portion of each of said second shells to a second fluid flow zone located in the upper portion of said vessel.

6. The apparatus of claim 5, further comprising aeration means for introducing air into said first fluid flow zone.

7. The apparatus of claim 6, wherein said aeration means includes an inlet port connected to a semi-circular conduit having a discharge nozzle at its proximate and distal ends.

8. The apparatus of claim 5, further comprising filtration means positioned intermediate said first and second fluid flow zones for collecting oil droplets from said first separated fluid as it passes therethrough.

\* \* \* \* \*